US012347071B2

(12) United States Patent
Lu (10) Patent No.: US 12,347,071 B2
(45) Date of Patent: Jul. 1, 2025

(54) VIRTUAL CLOTHING CHANGING METHOD AND APPARATUS, AND DEVICE AND MEDIUM (71) Applicant: Beijing Bytedance Network Technology Co., Ltd., Beijing (CN)

(72) Inventor: Yifan Lu, Beijing (CN)

(*) Notice: Subject to any disclaimer, the term of this patent is extended or adjusted under 35 U.S.C. 154(b) by 27 days.

(21) Appl. No.: 18/012,128

(22) PCT Filed: May 26, 2021

(86) PCT No.: PCT/CN2021/096146
§ 371 (c)(1),
(2) Date: Dec. 21, 2022

(87) PCT Pub. No.: WO2021/258971
PCT Pub. Date: Dec. 30, 2021

(65) Prior Publication Data
US 2023/0267584 A1 Aug. 24, 2023

(30) Foreign Application Priority Data
Jun. 24, 2020 (CN) .......................... 202010587335.3

(51) Int. Cl.
*G06T 5/50* (2006.01)
*G06T 7/70* (2017.01)
(Continued)

(52) U.S. Cl.
CPC .................. *G06T 5/50* (2013.01); *G06T 7/70* (2017.01); *G06T 17/00* (2013.01); *G06V 10/25* (2022.01);
(Continued)

(58) Field of Classification Search
CPC ... G06T 5/50; G06T 7/70; G06T 2207/20084; G06T 17/00; G06T 2207/20132;
(Continued)

(56) References Cited

U.S. PATENT DOCUMENTS 9,710,716 B2 * 7/2017 Case ...................... G06V 40/16
9,996,981 B1 6/2018 Tran et al.
(Continued)

FOREIGN PATENT DOCUMENTS

CN 105426867 A 3/2016
CN 105788002 A 7/2016
(Continued)

OTHER PUBLICATIONS

ISA China Patent Office, International Search Report issued in Application No. PCT/CN2021/096146, Sep. 1, 2021, WIPO, 6 pages.
(Continued)

*Primary Examiner* — Phi Hoang
(74) *Attorney, Agent, or Firm* — Alleman Hall & Tuttle LLP (57) ABSTRACT

Disclosed are a virtual clothing changing method and apparatus. One specific embodiment of the method comprises: extracting foot images from a target image in which the feet are displayed; generating foot posture information on the basis of the foot images; and on the basis of the foot posture information, superimposing a clothing pattern onto the feet displayed in the target image. The embodiment not only makes it convenient for a customer to buy suitable clothing, but also ensures the accuracy of virtual clothing changing, thereby facilitating an improvement in the experience of the customer buying the clothing.

9 Claims, 5 Drawing Sheets (51) Int. Cl.
*G06T 17/00* (2006.01)
*G06V 10/25* (2022.01)

(52) U.S. Cl.
CPC .......... *G06T 2207/20084* (2013.01); *G06T 2207/20132* (2013.01); *G06T 2207/20221* (2013.01); *G06V 2201/07* (2022.01)

(58) Field of Classification Search
CPC ... G06T 2207/20221; G06T 2219/2016; G06T 19/20; G06T 2219/2024; G06T 19/00; G06V 10/25; G06V 2201/07; G06Q 30/0643; G06Q 30/0623; G06Q 30/015
See application file for complete search history.

(56) References Cited

U.S. PATENT DOCUMENTS

| | | | |
|---|---|---|---|
| 10,013,803 | B2 | 7/2018 | Mach Shepherd et al. |
| 2020/0265645 | A1* | 8/2020 | Price ...................... G06T 11/60 |
| 2020/0366671 | A1* | 11/2020 | Larson ..................... G06F 9/451 |
| 2021/0163313 | A1* | 6/2021 | Arndt ...................... C02F 3/006 |
| 2021/0271866 | A1* | 9/2021 | Hayakawa ............. G06V 20/41 |
| 2022/0188897 | A1* | 6/2022 | Szeli ........................ G06T 7/70 |

FOREIGN PATENT DOCUMENTS

| | | | |
|---|---|---|---|
| CN | 108062526 | A | 5/2018 |
| CN | 108961015 | A | 12/2018 |
| CN | 109448007 | A | 3/2019 |
| CN | 109949368 | A | 6/2019 |
| CN | 109978640 | A | 7/2019 |
| CN | 110288715 | A | 9/2019 |
| CN | 110335314 | A | 10/2019 |
| CN | 110363867 | A | 10/2019 |
| CN | 111191599 | A | 5/2020 |
| CN | 107301408 | B | 6/2020 |
| CN | 111754303 | A | 10/2020 |
| DE | 102007043836 | B3 | 1/2009 |
| EP | 3599590 | A1 | 1/2020 |
| JP | 2011198112 | A | 10/2011 |
| WO | 2018102919 | A1 | 6/2018 |

OTHER PUBLICATIONS

China National Intellectual Property Administration, Office action issued in Chinese Application No. 202010587335.3, Nov. 19, 2021, 9 pages.
Alarcon, N., "New App Uses AI to Enable Users to Explore Sneakers in AR," NVIDIA Technical Blog, Available Online at https://developer.nvidia.com/blog/new-app-uses-ai-to-enable-users-to-explore-sneakers-in-ar/, Feb. 1, 2019, 2 pages.
European Patent Office, Extended European Search Report Issued in Application No. 21828848.8, Jul. 11, 2023, Germany, 13 pages.
Kumar, H., "Quick intro to Object Detection: R-CNN, YOLO, and SSD," Technical Fridays Blog, Available Online at https://kharshit.github.io/blog/2019/03/15/quick-intro-to-object-detection, Mar. 15, 2019, 9 pages.
Liu, J et al., "Realtime RGB-Based 3D Object Pose Detection Using Convolutional Neural Networks," IEEE Sensors Journal, vol. 20, No. 20, Oct. 14, 2019, 8 pages.
Written Opinion for International Application No. PCT/CN2021/096146, mailed Sep. 1, 2021, 08 Pages.
Communication pursuant to Article 94(3) EPC for European Application No. 21828848.8, mailed Mar. 11, 2025, 12 pages.

\* cited by examiner

VIRTUAL CLOTHING CHANGING METHOD AND APPARATUS, AND DEVICE AND MEDIUM

CROSS-REFERENCE TO RELATED APPLICATIONS

The present application is the national phase application of International Patent Application No. PCT/CN2021/096146, titled "VIRTUAL CLOTHING CHANGING METHOD AND APPARATUS, AND DEVICE AND MEDIUM", filed on May 26, 2021, which claims priority to Chinese Patent Application No. 202010587335.3, titled "VIRTUAL CLOTHING CHANGING METHOD AND APPARATUS, AND DEVICE AND MEDIUM", filed on Jun. 24, 2020 with the National Intellectual Property Administration, PRC, both of which are incorporated herein by reference in their entireties.

FIELD

The present disclosure relates to the technical field of computers, and in particular to a method and apparatus for simulating clothing changing.

BACKGROUND

At present, people generally shop online and in convenience stores or shopping arcades. However, when purchasing foot clothing online, there is a problem that the clothing is inappropriate or a user is not satisfied with the clothing. One of the reasons is that it is impossible for the user to intuitively feel the effect of wearing the foot clothing. Further, there also has a problem of inconvenience wearing of clothing when shopping in convenience stores or shopping arcades.

SUMMARY

The summary part of the present disclosure is used to introduce concept in a brief way, which will be described in detail in the following embodiments. The summary part of the present disclosure is not intended to identify the essential features or necessary features of the technical solution required to be protected, nor is it intended to limit the scope of the technical solution required to be protected.

A method and apparatus for simulating clothing changing, an apparatus and a computer-readable medium are provided according to some embodiments of the present disclosure, to solve the technical problems described in the background part.

In a first aspect, a method for simulating clothing changing is provided according to an embodiment of the present disclosure, which includes: extracting a foot image from a target image displaying a foot; generating foot posture information based on the foot image; superimposing, based on the foot posture information, a pattern of a clothing on the foot displayed in the target image.

In a second aspect, an apparatus for simulating clothing changing is provided according to an embodiment of the present disclosure, which includes: an extraction unit configured to extract a foot image from a target image displaying a foot; a generation unit configured to generate foot posture information based on the foot image; a superposition unit configured to superimpose a pattern of a clothing on the foot displayed in the target image based on the foot posture information.

In a third aspect, an electronic apparatus is provided according to some embodiments of the present disclosure, which includes: one or more processors; and a storage device configured to store one or more programs. The one or more programs, when executed by the one or more processors, cause the one or more processors to perform any one of the methods according to the first aspect.

In a fourth aspect, a computer-readable medium is provided according to some embodiments of the present disclosure, which includes a computer program stored thereon. The program, when executed by a processor, performs any one of the methods according to the first aspect.

Each of the embodiments of the present disclosure has the following beneficial effects. With the method for simulating clothing changing, a foot image is extracted from a target image. Foot posture information is generated to determine relevant information of the foot, so that a pattern of a clothing can be accurately superimposed on the foot displayed in the target image. Therefore, the clothing changing is simulated intuitively and effectively.

BRIEF DESCRIPTION OF THE DRAWINGS

The above and other features, advantages and aspects of embodiments of the present disclosure will become more apparent in combination with the drawings and with reference to the following embodiments. Throughout the drawings, the same or similar reference numerals represent the same or similar elements. It is to be understood that the drawings are schematic and that originals and elements are not necessarily drawn to scale.

DETAILED DESCRIPTION OF THE EMBODIMENTS

Embodiments of the present disclosure will be described in more detail below with reference to the drawings. Although some embodiments of the present disclosure are shown in the accompanying drawings, it is to be understood that the present disclosure may be implemented in various forms, and should not be interpreted as limited to the embodiments described herein. On the contrary, these embodiments are provided for a more thorough and complete understanding of the present disclosure. It is to be understood that the drawings and embodiments of the present disclosure are only for illustrative purposes and are not intended to limit the scope of protection of the present disclosure.

It is also to be noted that, for convenience of description, only the parts related to the present disclosure are shown in the drawings. Without conflict, the embodiments and features in the embodiments in the present disclosure may be combined with each other.

It is to be noted that the terms "first", "second" and the like used in the present disclosure are only used to distinguish different devices, modules or units, and are not used to define the order or interdependence of functions performed by these devices, modules or units.

It is to be noted that the terms "one" and "many" used in the present disclosure is schematic rather than restrictive, and those skilled in the art should understand that, unless otherwise explicitly pointed out in the context, it should be understood as "one or more".

The names of messages or information transmitted between multiple devices in the embodiment of the present disclosure are only used for illustrative purposes, and are not used to limit the scope of these messages or information.

The present disclosure will be described in detail below with reference to the drawings and in combination with embodiments.

Figure 1:
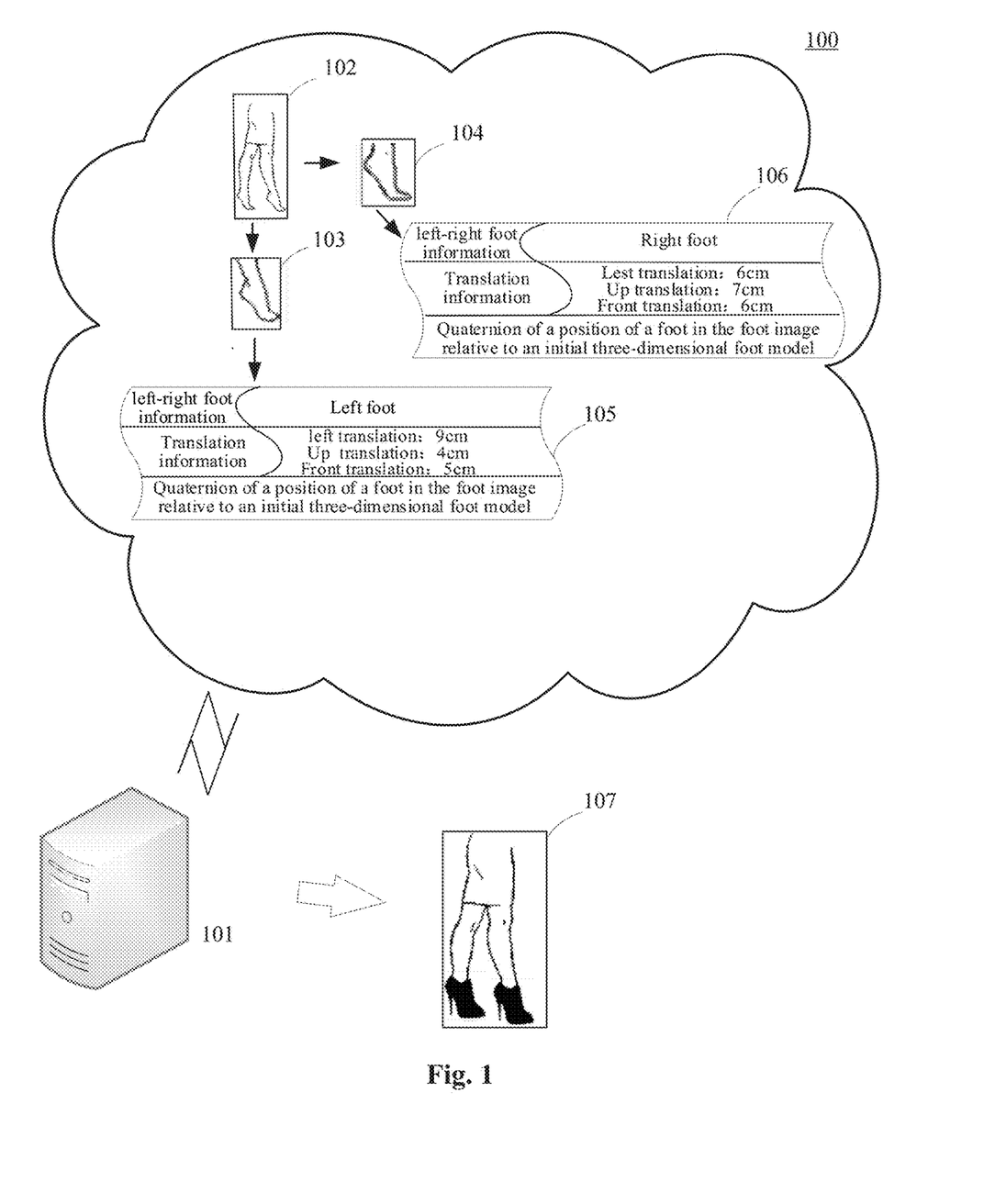
FIG. 1 is a schematic diagram of an application scenario of a method for simulating clothing changing according to some embodiments of the present disclosure.

FIG. 1 is a schematic diagram of an application scenario 100 of a method for simulating clothing changing according to some embodiments of the present disclosure.

As shown in FIG. 1, the organism may be a human body. For example, the computer device 101 may extract a left foot image 103 and a right foot image 104 from a target image 102 displaying feet. Left foot information 105 and right foot information 106 are generated respectively based the foot image 103 and the foot image 104. For example, the left foot information 105 may indicates "left-right foot information: left foot; translation information: left translation of 9 cm, right translation of 4 cm, and front translation of 5 cm; and a quaternion of a position of a foot in the foot image 103 relative to an initial three-dimensional foot model", and the right foot information 106 indicates "left-right foot information: right foot; translation information: left translation of 6 cm, right translation of 7 cm, and front translation of 6 cm; a quaternion of a position of a foot in the foot image 104 relative to an initial three-dimensional foot model". Based the left foot information 103 and the right foot information 104, a pattern of a clothing is superimposed on each foot displayed in the target image 102 to obtain a rendered target image 107.

It is to be understood that the method for processing a feature map may be performed by the computer device 101. The computer device 101 may be hardware or software. When the computer device 101 is hardware, the computer device 101 may be various electronic devices with information processing functions, including but not limited to smart phones, tablet computers, e-book readers, laptop computers, desktop computers, servers, and the like. When the computer device 101 is software, the computer device 101 may be installed in the above listed electronic devices, and may be implemented, for example, as multiple software or software modules used to provide distributed services, or a single software or software module, which is not limited herein.

It is to be understood that the number of computer devices in FIG. 1 is only schematic, and the number of computer devices may be determined according to actual needs.

Figure 2:
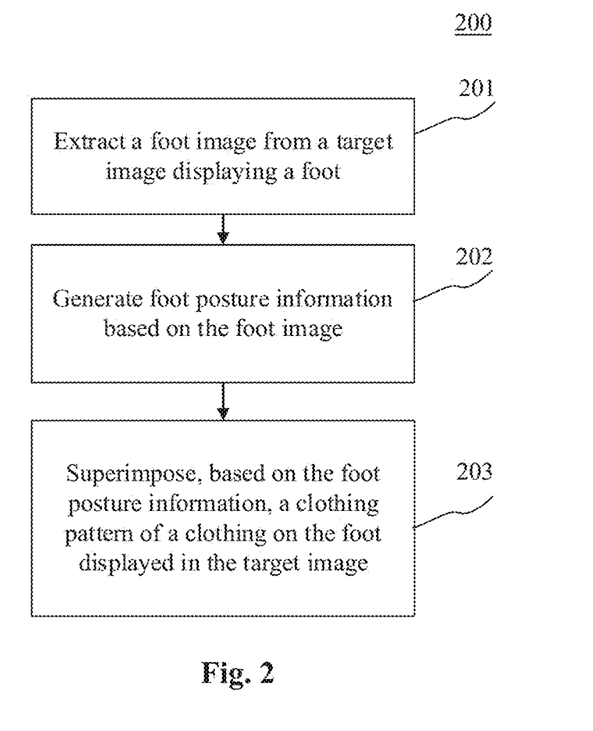
FIG. 2 is a flowchart of a method for simulating clothing changing according to an embodiment of the present disclosure.

Referring to FIG. 2, FIG. 2 shows a flowchart 200 of a method for simulating clothing changing according to an embodiment of the present disclosure. The method for simulating clothing changing includes the following steps 201 to 203.

In step 201, a foot image is extracted from a target image displaying a foot.

In some embodiments, an executing body (for example, the computer device shown in FIG. 1) of the method for simulating clothing changing may extract the foot image from the target image displaying a foot. The target image may be obtained by extracting a frame from a real-time video. For example, the foot image may be extracted from the target image by using a method of combining Histogram of Orientated Gradient (HOG) with Support Vector Machine (SVM).

In step 202, foot posture information is generated based on the foot image.

In some embodiments, the executing body may generate foot posture information based on the foot image obtained in step 201.

In an embodiment, the foot posture information may include: a quaternion of a position of a foot in the foot image relative to a position of an initial three-dimensional foot model, translation information of the position of the foot in the foot image relative to the position of the initial three-dimensional foot model, and left-right foot information in the foot image.

The initial three-dimensional foot model may be set by the executing body, and relevant information of the initial three-dimensional foot model is determined. For example, the relevant information may include, but is not limited to, at least one of the following: a quaternion of the initial three-dimensional foot model, left-right foot information of the initial three-dimensional foot model, and translation information of the initial three-dimensional foot model.

Further, a model that the foot posture information is determined, the quaternion may be obtained by adding a real number with three imaginary units i, j, k, where $i^2=j^2=k^2=-1$, $i^0=j^0=k^0=1$. Each quaternion is a linear combination of 1, i, j, and k, that is, a quaternion may generally be expressed as a+bi+cj+dk, where a, b, c, and d are real numbers.

It is to be noted that the geometric meaning of i, j, k may be understood as a rotation, where rotation i represents a rotation of a positive direction of the axis X to a positive direction of the axis Y in a plane where the axis X intersects the axis Y, rotation j represents a rotation of a positive direction of the axis Z to a positive direction of the axis X in a plane where the axis Z intersects the axis X, rotation k represents a rotation of a positive direction of the axis Y to the positive direction of the axis Z in a plane where the axis Y intersects the axis Z, and −i, −j, and −k respectively represent reverse rotations of the rotations i, j, and k.

Here, the quaternion of the position of the foot in the foot image relative to the position of the initial three-dimensional foot model may be determined in the following steps 1 to 3.

In step 1, coefficients of a1, b1, c1 and d1 in the quaternion of the position of the foot in the foot image are determined.

In step 2, the coefficients of a2, b2, c2 and d2 in the quaternion of the position of the initial three-dimensional foot model are determined.

In step 3, the coefficients of a1, b1, c1, d1 are compared with the coefficients a2, b2, c2, d2 to obtain coefficients of a3, b3, c3, d3 in the quaternion of the position of the foot in the foot image relative to the position of the initial three-dimensional foot model.

For example, the foot image may be inputted into a pre-trained DenseNet to generate foot posture information.

In some implementations of some embodiments, the executing body may input the foot image into a pre-trained foot posture estimation network to obtain foot posture information. The foot posture information includes: a quaternion of the position of the foot in the foot image relative to the position of the initial foot model, translation information of the position of the foot in the foot image relative to the position of the initial foot model, and left-right foot information in the foot image.

In step 203, a pattern of a clothing is superimposed on the foot displayed in the target image based on the foot posture information.

In some embodiments, the executing body superimposes a pattern of a clothing on the foot displayed in the target image based on the foot posture information. The clothing may be a general term of articles that used to decorate a foot, including but not limited to at least one of the following: shoes, socks, accessories. Here, the pattern of the clothing may be determined by a three-dimensional clothing model that is selected by a user and matches the initial three-dimensional model. For example, the foot displayed in the target image may be superimposed with a pattern of a clothing in various ways based on the foot posture information.

The method for simulating clothing changing is provided according to some embodiments of the present disclosure. With the method for simulating clothing changing, a foot image is extracted from a target image. Foot posture information is generated to determine relevant information of the foot, so that a pattern of a clothing can be accurately superimposed on the foot displayed in the target image. Therefore, the clothing changing is simulated intuitively and effectively.

Figure 3:
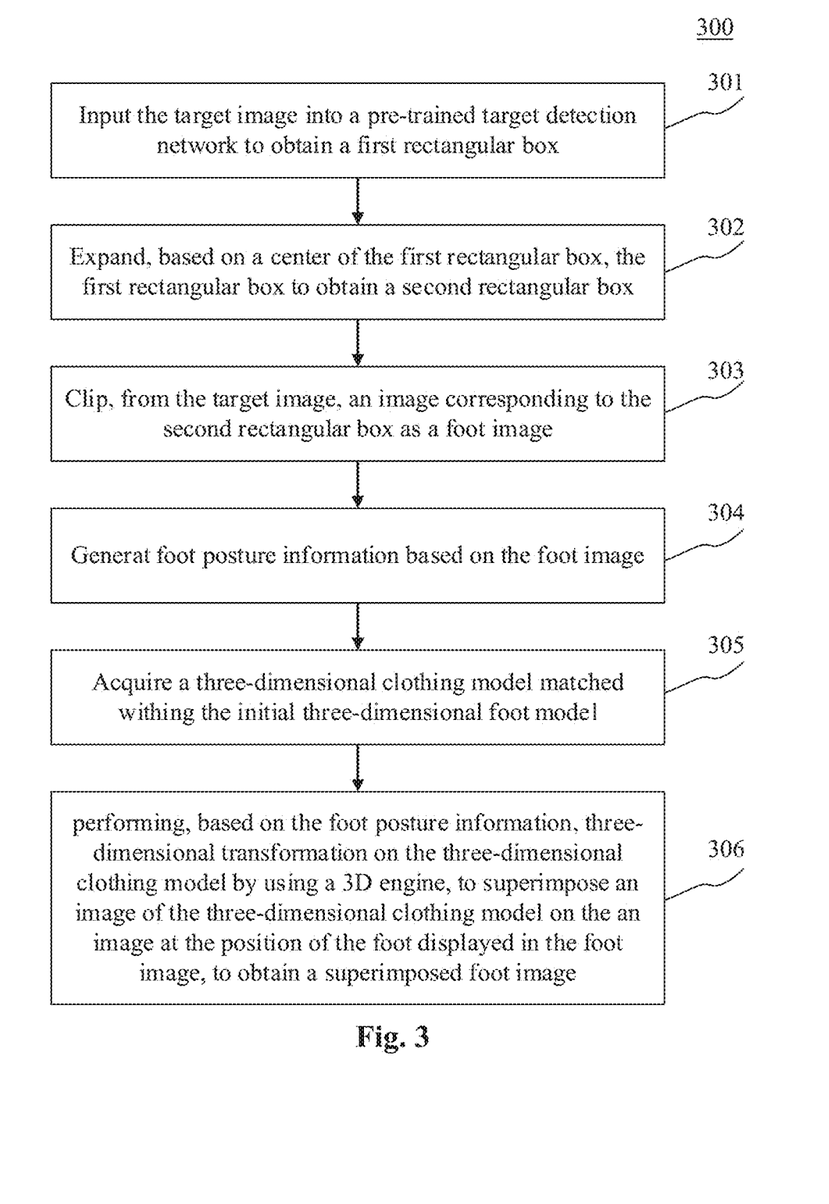
FIG. 3 is a flowchart of a method for simulating clothing changing according to another embodiment of the present disclosure.

FIG. 3 is a flowchart 300 of a method for simulating clothing changing according to another embodiment of the present disclosure. The method for simulating clothing changing comprises the following steps 301 to 306.

In step 301, a target image displaying a foot is inputted to a pre-trained target detection network to obtain a first rectangular box.

In some embodiments, an image in the first rectangular box may include an entire foot or a part of the foot. Here, foot information may be detected by inputting the image in the first rectangular box to the pre-trained convolutional neural network.

In some implementations of some embodiments, the target detection network may be one of the following: a Fast R-CNN algorithm network, a Faster R-CNN algorithm network, a YOLO series algorithm network, and an SSD algorithm network.

In step 302, the first rectangular box is expanded based on a center of the first rectangular box to obtain a second rectangular box.

In some embodiments, the executing body expands the first rectangular box based on the center of the first rectangular box to obtain the second rectangular box. An image in the second rectangular box may include the entire foot.

In step 303, the image corresponding to the second rectangular box is cropped from the target image as the foot image.

In some embodiments, the executing body may crop the image corresponding to the second rectangular box from the target image as the foot image. For example, the image corresponding to the second rectangular box may be cropped by using an Open Source Computer Vision Library (OpenCV), and the clipped image is used as the foot image.

In step 304, foot posture information is generated based on the foot image.

In some embodiments, for the specific implementation of step 304 and the technical effects thereof, reference may be made to step 202 in the embodiments corresponding to FIG. 2, which will not be repeated here.

In step 305, a three-dimensional clothing model matching the initial three-dimensional foot model is acquired.

In some embodiments, the executing body may obtain a three-dimensional clothing model matching the initial three-dimensional foot model.

In step 306, based on the foot posture information, a 3D engine is used to perform three-dimensional transformation on the three-dimensional shoe model, and an image at a position of the foot displayed in the foot image is superimposed with an image of the three-dimensional clothing model to obtain a superimposed foot image.

In some embodiments, the executing body performs three-dimensional transformation on the three-dimensional clothing model by using a rendering engine, that is, the 3D engine, based on the foot posture information, and translates the position of the three-dimensional clothing model onto the position of the foot displayed in the foot image. Then, the image at the position of the foot displayed in the foot image is superimposed with the image of the three-dimensional clothing model to obtain the superimposed foot image. The position of the foot displayed in the foot image may be obtained by using the initial three-dimensional foot model based on the foot posture information.

Here, the 3D engine may include a collection of algorithms that represent real matters in forms of polygons or various curves, perform relevant calculations in the computer, and output a final image. The 3D engine may simulate the three-dimensional transformation of the three-dimensional clothing model in a computer based on information of the quaternion of the position of the foot in the foot image relative to the position of the initial foot model. Functions of the 3D engine include: data management, renderer and interaction.

It may be seen from FIG. 3 that, compared with the description of some embodiments corresponding to FIG. 2, the flowchart 300 of the method for simulating clothing changing in some embodiments corresponding to FIG. 3 further include detailed steps of extracting a foot image from a target image displaying a foot, which provides convenience for users to try on foot related clothing, thereby improving the accuracy of simulating clothing changing.

Figure 4:
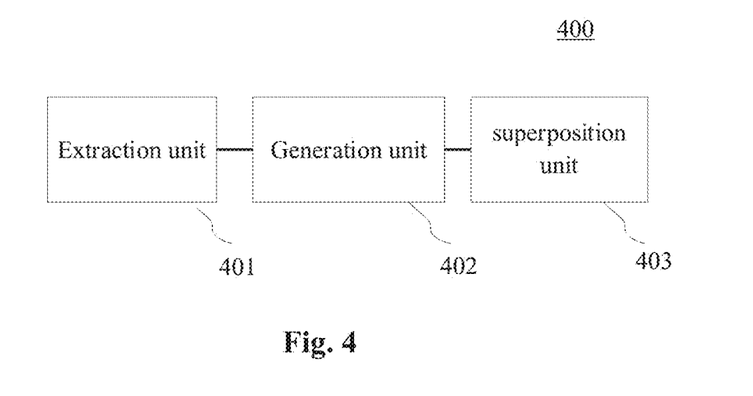
FIG. 4 is a schematic structural diagram of an apparatus for simulating clothing changing according to some embodiments of the present disclosure.

As shown in FIG. 4, a device 400 for simulating clothing changing according to some embodiments includes: an extraction unit 401, a generation unit 402 and a superposition unit 403. The extraction unit 401 is configured to extract a foot image from a target image displaying a foot. The generation unit 402 is configured to generate foot posture information based on the foot image. The superposition unit 403 is configured to superimpose a pattern of a clothing on the foot displayed in the target image based on the foot posture information.

In some implementations of some embodiments, the extraction unit 401 may be further configured to: input the target image into a pre-trained target detection network to obtain a first rectangular box; expand, based on a center of the first rectangular box, the first rectangular box to obtain a second rectangular box; and clip, from the target image, an image corresponding to the second rectangular box as the foot image.

In some implementations of some embodiments, the generation unit 402 may be further configured to input the foot image into a pre-trained foot pose estimation network to obtain foot pose information. The foot pose information includes: a quaternion of a position of the foot in the foot image relative to a position of an initial three-dimensional foot model, translation information of the position of the foot in the foot image relative to the position of the initial three-dimensional foot model, and left-right foot information in the foot image.

In some implementations of some embodiments, the superposition unit 403 may be further configured to: acquire a three-dimensional clothing model matching the initial three-dimensional foot model; perform, based on the foot posture information, three-dimensional transformation on the three-dimensional clothing model by using a 3D engine, to superimpose an image of the three-dimensional clothing model on the image at the position of the foot displayed in the foot image, to obtain a superimposed foot image; and obtain a rendered target image based on the superimposed foot image.

In some implementations of some embodiments, the target detection network may be one of the following: a Fast R-CNN algorithm network, a Faster R-CNN algorithm network, a YOLO series algorithm network, and an SSD algorithm network.

It may be understood that the units in the device 400 respectively correspond to steps of the method described with reference to FIG. 2. Therefore, the operations, features and beneficial effects described above for the method are also applied to the device 400 and the units included therein, which will not be repeated here.

Figure 5:
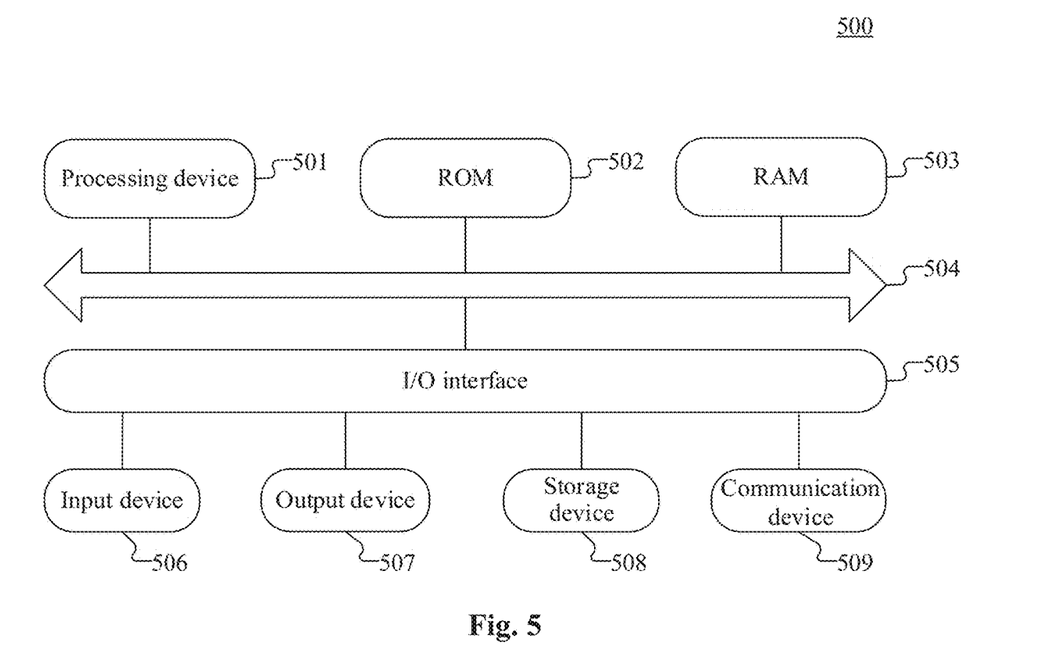
FIG. 5 is a schematic structural diagram of an electronic apparatus suitable for implementing some embodiments of the present disclosure.

Next, referring to FIG. 5, a schematic structural diagram of an electronic apparatus 500 (for example, the computer device shown in FIG. 1) suitable for implementing some embodiments of the present disclosure is shown. The computer device shown in FIG. 5 is only an example, and should not limit the function and scope of use of the embodiments of the present disclosure.

As shown in FIG. 5, the electronic apparatus 500 may include a processing device 501 (for example, a central processor, a graphics processor, and the like), which may perform various appropriate actions and processing according to programs stored in a read-only memory (ROM) 502 or programs loaded into a random access memory (RAM) 503 from a storage device 508. In the RAM 503, various programs and data required for the operation of the electronic apparatus 500 are also stored. The processing device 501, the ROM 502 and the RAM 503 are connected to each other through a bus 504. The input/output (I/O) interface 505 is also connected to the bus 504.

Generally, the following devices may be connected to the I/O interface 505: an input device 506 including, for example, a touch screen, a touch pad, a keyboard, a mouse, a camera, a microphone, an accelerometer, a gyroscope, and the like; an output device 507 including, for example, a liquid crystal display (LCD), a loudspeaker, a vibrator, and the like; a storage device 508 including, for example, a tape, a hard disk, and the like; and a communication device 509. The communication device 509 may allow electronic apparatus 500 to communicate wirelessly or wirelessly with other devices to exchange data. Although FIG. 5 shows an electronic apparatus 500 with various devices, it is to be understood that it is unnecessary to implement or have all the devices shown. Alternatively, more or fewer devices may be implemented or provided. Each block shown in FIG. 5 may represent a device or multiple devices according to actual needs.

Specifically, according to some embodiments of the present disclosure, the process described above with reference to the flowchart may be implemented as a computer software program. For example, some embodiments of the present disclosure provide a computer program product, which includes a computer program stored on a computer-readable medium. The computer program includes program codes for executing the method shown in the flowchart. In such embodiments, the computer program may be downloaded and installed from the network through the communication device 509, or installed from the storage device 508, or installed from the ROM 502. When the computer program is executed by the processing device 501, the functions defined in the method of some embodiments of the present disclosure are executed.

It is to be noted that the computer readable storage medium according to some embodiments of the present disclosure may be a computer readable signal medium or a computer readable storage medium or a combination thereof. The computer readable storage medium may include, but is not limited to, a system, an apparatus, or a device in an electronic, magnetic, optical, electromagnetic, infrared, or semi-conductive form, or any combination thereof. Further, the computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may include a data signal transmitted in a baseband or transmitted as a part of a carrier wave and carrying computer readable program codes. The transmitted data signal may be in various forms, including but not limited to an electromagnetic signal, an optical signal or a combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, radio frequency (RF) and the like, or any combination thereof.

In some embodiments, the client and the server may perform communication using any currently known or future developed network protocol such as HyperText Transfer Protocol (HTTP), and may be interconnected with a digital data communication (for example, a communication network) in any form or by any medium. Examples of the communication network include a local area network (LAN), a wide area network (WAN), the Internet Work (for example, the Internet), and a peer-to-peer network (for example, an ad hoc peer-to-peer network), as well as any currently known network or a future developed network.

The computer readable medium may be incorporated in the electronic apparatus, or may exist alone without being assembled into the electronic apparatus. The computer readable medium carries one or more programs. The computer-readable medium carries one or more programs. The one or more programs, when executed by the electronic apparatus, cause the electronic apparatus to: extract a foot image from a target image displaying a foot; generate, foot posture information based on the foot image; and superimpose, based on the foot posture information, a pattern of a clothing on the foot displayed in the target image.

Computer program codes for performing operations of some embodiments of the present disclosure may be written in one or more programming languages or any combination thereof, including but not limited to object-oriented programming languages, such as Java, Smalltalk, C++, and conventional procedural programming languages, such as the "C" language or similar programming languages. The program codes may be executed entirely or partly on a computer of a user, executed as a stand-alone software package, executed partly on the computer of the user and partly on a remote computer, or entirely on the remote computer or server. In the case of a remote computer, the remote computer may be connected to the computer of the user through any kind of network, including a local area network (LAN) or a wide area network (WAN), or may be connected to an external computer (for example, via an Internet connection provided by an Internet service provider).

The flowchart and block diagrams in the drawings illustrate the architecture, functionality, and operation of possible implementations of systems, methods and computer program products according to the embodiments of the present disclosure. In this regard, each block in the flowchart or block diagrams may represent a module, a segment, or a portion of code that contains executable instructions for implementing the specified logical functions. It is also to be noted that, in some alternative implementations, the functions noted in the blocks may be executed out of the order noted in the figures. For example, two blocks shown in succession may, in fact, be executed substantially concurrently, or may be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or operations, or may be implemented in a combination of dedicated hardware and computer instructions.

The units described in some embodiments of the present disclosure may be implemented in software or hardware. The described unit may also be set in the processor, for example, which may be described as: a processor including an extraction unit, a generation unit and a superposition unit. The names of these units do not constitute a definition of the unit itself in some cases. For example, the extraction unit may also be described as "a unit configured to extract a foot image from a target image displaying a foot".

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

According to one or more embodiments of the present disclosure, a method for simulating clothing changing is provided, which includes: extracting a foot image from a target image displaying a foot; generating foot posture information based on the foot image; and; superimposing, based on the foot posture information, a pattern of a clothing on the foot displayed in the target image.

According to one or more embodiments of the present disclosure, the extracting a foot image from a target image displaying a foot includes: inputting the target image into a pre-trained target detection network to obtain a first rectangular box; expanding, based on a center of the first rectangular box, the first rectangular box to obtain a second rectangular box; and clipping, from the target image, an image corresponding to the second rectangular box as the foot image.

According to one or more embodiments of the present disclosure, the generating foot posture information based on the foot image includes: inputting the foot image into a pre-trained foot pose estimation network to obtain foot pose information, where the foot pose information comprises: a quaternion of a position of the foot in the foot image relative to a position of an initial three-dimensional foot model, translation information of the position of the foot in the foot image relative to the position of the initial three-dimensional foot model, and left-right foot information in the foot image.

According to one or more embodiments of the present disclosure, the superimposing, based on the foot posture information, a pattern of a clothing on the foot displayed in the target image includes: acquiring a clothing three-dimensional model matching the initial three-dimensional foot model; performing, based on the foot posture information, three-dimensional transformation on the three-dimensional clothing model by using a 3D engine, to superimpose an image of the three-dimensional clothing model on an image at the position of the foot displayed in the foot image, to obtain a superimposed foot image; and obtaining a rendered target image based on the superimposed foot image.

According to one or more embodiments of the disclosure, the target detection network may be one of the following: a Fast R-CNN algorithm network, a Faster R-CNN algorithm network, a YOLO series algorithm network, and an SSD algorithm network.

According to one or more embodiments of the present disclosure, an electronic apparatus is provided, which includes: one or more processors; and a storage device configured to store one or more programs. The one or more programs, when executed by the one or more processors, cause the one or more processors to perform the method described in any one of the above embodiments.

According to one or more embodiments of the present disclosure, a computer-readable medium is provided, which has a computer program stored thereon. The computer program, when executed by a processor, performs the method described in any one of the above embodiments.

The above description merely illustrates the embodiments of the present disclosure and the technical principles employed. Those skilled in the art should understand that the scope of present disclosure is not limited to the technical solutions formed by any combination of the above-mentioned technical features, and should also cover other technical solutions formed by any combination of the above-mentioned technical features and any equivalent features without departing from the above disclosed concept, for example, a technical solution formed by replacing the above features with the technical features disclosed in the embodiments of the present disclosure (but not limited to) with similar functions.

What is claimed is:

1. A method for simulating clothing changing, comprising:
   extracting a foot image from a target image displaying a foot;
   generating foot posture information based on the foot image; and
   superimposing, based on the foot posture information, a pattern of a clothing on the foot displayed in the target image;

wherein the generating the foot posture information based on the foot image comprises inputting the foot image into a pre-trained foot pose estimation network to obtain foot pose information, and wherein the foot pose information comprises a quaternion of a position of the foot in the foot image relative to a position of an initial three-dimensional foot model, translation information of the position of the foot in the foot image relative to the position of the initial three-dimensional foot model, and left-right foot information in the foot image.

2. The method according to claim 1, wherein the extracting a foot image from a target image displaying a foot comprises:

inputting the target image into a pre-trained target detection network to obtain a first rectangular box;

expanding, based on a center of the first rectangular box, the first rectangular box to obtain a second rectangular box; and clipping, from the target image, an image corresponding to the second rectangular box as the foot image.

3. The method according to claim 2, wherein the target detection network is one of the following:

a Fast Region-based Convolutional Neural Network (R-CNN) algorithm network, a Faster R-CNN algorithm network, a You Only Look Once (YOLO) series algorithm network, and a Single Shot MultiBox Detector (SSD) algorithm network.

4. The method according to claim 1, wherein the superimposing, based on the foot posture information, a pattern of a clothing on the foot displayed in the target image comprises:

acquiring a three-dimensional clothing model matching the initial three-dimensional foot model;

performing, based on the foot posture information, three-dimensional transformation on the three-dimensional clothing model by using a 3D engine, to superimpose an image of the three-dimensional clothing model on an image at the position of the foot displayed in the foot image, to obtain a superimposed foot image; and obtaining a rendered target image based on the superimposed foot image.

5. A device for simulating clothing changing, comprising:
at least one processor; and
at least one memory communicatively coupled to the at least one processor and storing instructions that upon execution by the at least one processor cause an apparatus to:
extract a foot image from a target image displaying a foot;
generate foot posture information based on the foot image; and
superimpose, based on the foot posture information, a pattern of a clothing on the foot displayed in the target image; and
input the foot image into a pre-trained foot pose estimation network to obtain foot pose information, wherein the foot pose information comprises a quaternion of a position of the foot in the foot image relative to a position of an initial three-dimensional foot model, translation information of the position of the foot in the foot image relative to the position of the initial three-dimensional foot model, and left-right foot information in the foot image.

6. The device according to claim 5, the at least one memory further storing instructions that upon execution by the at least one processor cause the apparatus to:

input the target image into a pre-trained target detection network to obtain a first rectangular box;

expand, based on a center of the first rectangular box, the first rectangular box to obtain a second rectangular box; and clip, from the target image, an image corresponding to the second rectangular box as the foot image.

7. The device according to claim 5, the at least one memory further storing instructions that upon execution by the at least one processor cause the apparatus to:

acquire a three-dimensional clothing model matching the initial three-dimensional foot model;

perform, based on the foot posture information, three-dimensional transformation on the three-dimensional clothing model by using a 3D engine, to superimpose an image of the three-dimensional clothing model on an image at the position of the foot displayed in the foot image, to obtain a superimposed foot image; and obtain a rendered target image based on the superimposed foot image.

8. The device according to claim 6, wherein the target detection network is one of the following:

a Fast Region-based Convolutional Neural Network (R-CNN) algorithm network, a Faster R-CNN algorithm network, a You Only Look Once (YOLO) series algorithm network, and a Single Shot MultiBox Detector (SSD) algorithm network.

9. A non-transitory computer-readable medium, bearing computer-readable instructions that upon execution on a computing device cause the computing device at least to:

extract a foot image from a target image displaying a foot;

generate foot posture information based on the foot image; and superimpose, based on the foot posture information, a pattern of a clothing on the foot displayed in the target image;

wherein the generate the foot posture information based on the foot image comprises:

input the foot image into a pre-trained foot pose estimation network to obtain foot pose information, wherein the foot pose information comprises a quaternion of a position of the foot in the foot image relative to a position of an initial three-dimensional foot model, translation information of the position of the foot in the foot image relative to the position of the initial three-dimensional foot model, and left-right foot information in the foot image.

* * * * *